United States Patent [19]
Arena

[11] Patent Number: 5,313,852
[45] Date of Patent: May 24, 1994

[54] DIFFERENTIAL LINEAR ACTUATOR
[75] Inventor: Aldo Arena, Smithtown, N.Y.
[73] Assignee: Grumman Aerospace Corporation, Long Island, N.Y.
[21] Appl. No.: 972,543
[22] Filed: Nov. 6, 1992
[51] Int. Cl.⁵ .................... F16H 29/02; F16H 1/20
[52] U.S. Cl. ................... 74/89.15; 74/89.13; 74/424.8 B
[58] Field of Search ............ 74/89.13, 89.15, 424.8 R, 74/424.8 B, 459

[56] References Cited
U.S. PATENT DOCUMENTS

| | | | |
|---|---|---|---|
| 2,564,180 | 8/1951 | Turrettini | 74/424.8 B |
| 3,404,581 | 10/1968 | Kraus | 74/424.8 R |
| 3,751,998 | 8/1973 | Vasilatos | 74/89.15 |
| 4,241,814 | 12/1980 | Masclet | 74/89.15 X |
| 4,637,272 | 1/1987 | Teske et al. | 74/89.15 X |
| 4,841,844 | 6/1989 | Tootle | 74/89.15 X |
| 5,144,851 | 9/1992 | Grimm et al. | 74/89.15 X |

FOREIGN PATENT DOCUMENTS

| | | | |
|---|---|---|---|
| 3-048054 | 3/1991 | Japan | 74/89.15 |
| 1221419 | 3/1986 | U.S.S.R. | 74/89.15 |
| 8404371 | 11/1984 | World Int. Prop. O. | 74/89.15 |

Primary Examiner—Leslie A. Braun
Assistant Examiner—David W. Laub
Attorney, Agent, or Firm—Bacon & Thomas

[57] ABSTRACT

A differential linear actuator is disclosed which minimizes the torque that must be reacted by an input, rotary drive sleeve member. The differential linear actuator includes an actuator housing within which the drive sleeve is rotatably mounted. An intermediate actuating member is concentrically mounted between the actuator housing and the drive sleeve and is connected to the drive sleeve through a spline connection such that rotation of the drive sleeve results in rotation of the intermediate actuator member. In addition, due to the spline connection and a rotary to linear connection assembly between the intermediate actuator member and the actuator housing, rotation of the intermediate actuator member results in axial displacement of the member relative to the actuator housing. An elongated output member is further connected to a remote end of the intermediate actuator member through a second rotary to linear connection assembly such that rotation of the intermediate actuator member also causes the output member to be axially shifted. The two rotary to linear connection assemblies are designed such that rotation of the drive sleeve in a given direction causes the intermediate actuator member and the output member to axially shift in opposite directions with the output member being axially displaced relative to the actuator housing a distance greater than the intermediate actuator member. In addition, a linear variable displacement transducer is adapted to be connected between the actuator housing and the output member to sense the position of the output member which can then be used to control the drive to the drive sleeve.

15 Claims, 1 Drawing Sheet

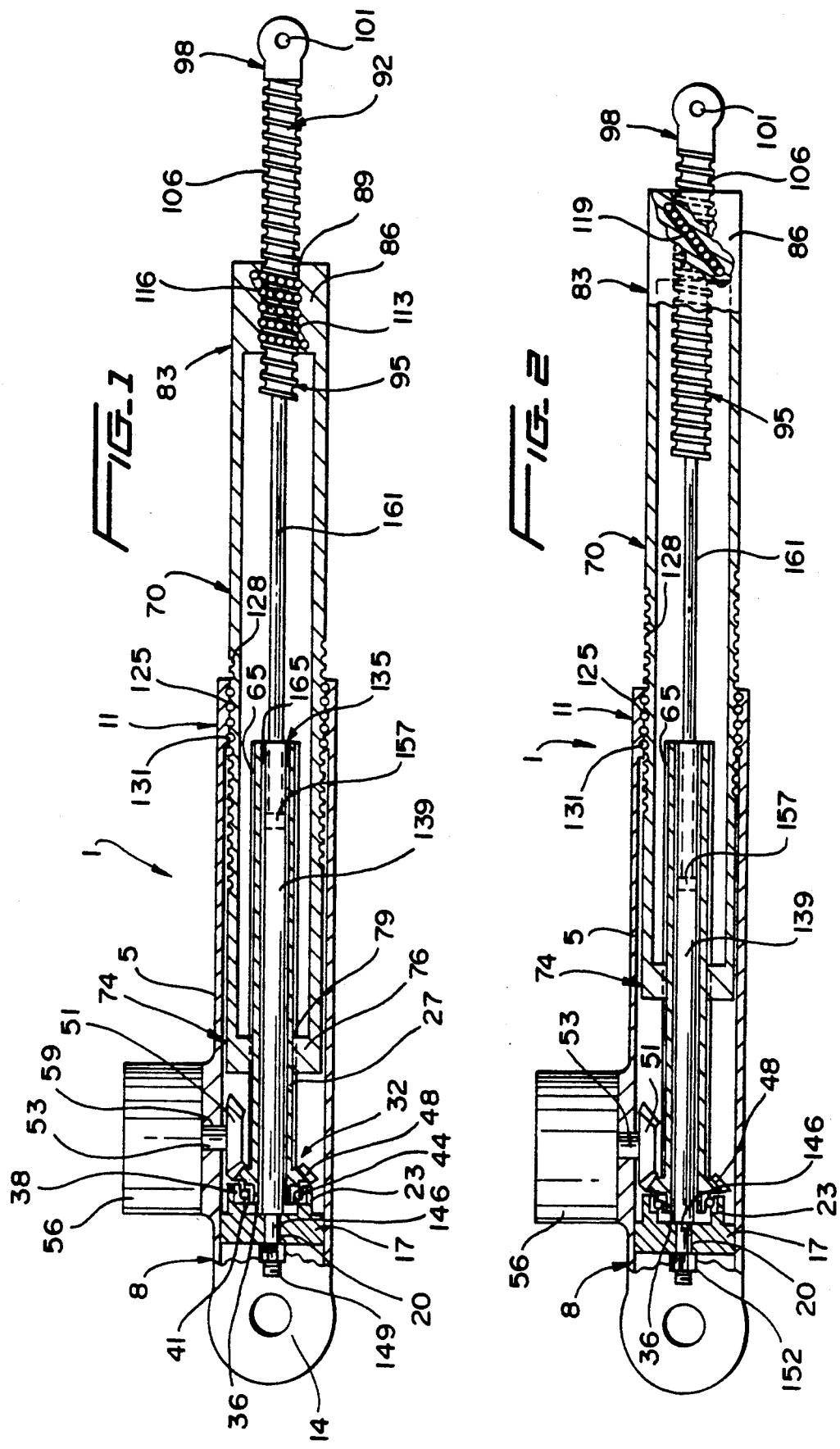

DIFFERENTIAL LINEAR ACTUATOR

BACKGROUND OF THE INVENTION

1. Field of the Invention

The present invention pertains to a linear actuator and, more particularly, a differential linear actuator having first and second components which are adapted to linearly shift in opposite directions in response to rotation of an input member in order to reduce the torque that must be counteracted by the input member.

2. Discussion of the Prior Art

Linear actuators are widely known in the art. A basic type of known linear actuator includes a fixed actuator housing within which is rotatably mounted a drive sleeve. An output member of the linear actuator is fixedly secured at one end to an element adapted to be shifted by the linear actuator and is also connected to the drive sleeve through a rotary to linear conversion connector such that rotation of the drive sleeve causes axial shifting of the output member. One type of known arrangement for causing this rotary to linear movement is a recirculating ball-type screw assembly. In such known linear actuator arrangements, the length at which the actuator can linearly shift the adjustable element is generally determined by the length of the output member. In addition, all of the torque exerted on the output member must be counteracted by the drive sleeve.

In another known type of linear actuator arrangement, the drive sleeve is connected through a plurality of splines to an intermediate, axially shiftable actuator member such that rotation of the drive sleeve causes rotation of the intermediate actuator member. The intermediate actuator member is also connected through a rotary to linear connection assembly to a fixed portion of the linear actuator such that rotation of the intermediate actuator member causes the member to axially shift. In addition, an output member of the linear actuator is further connected to the intermediate actuator member through a second rotary to linear conversion connection such that rotation of the intermediate actuator member also causes the output member to shift in the same direction as the intermediate actuator member. By this arrangement, since both the intermediate actuator member and the output member shift axially in the same direction, the linear actuator can produce a longer output stroke. In this prior art arrangement, the torque transmitted to the drive sleeve equals the combined torque exerted on the intermediate actuator member through the output member and the fixed portion of the linear actuator. In other words, since both the intermediate actuator member and the output member extend in the same direction, the torque reacted by the intermediate actuator member at both of the rotary to linear conversion connections combine to a high resultant torque which is transmitted to the input drive sleeve through the spline connection.

In some environments, such as landing flaps and other actuation systems used in military and commercial aircraft, the torque levels developed during use of such linear actuator arrangements are rather high and since the drive sleeve must counteract these torque values, the drive sleeves have to be made from strong, rather heavy materials in order to prevent system failure. In addition, there are various environments, such as in landing flap controls mentioned above, wherein only a relatively small amount of axial shifting is required, at high torque values, to move the control component throughout its entire operating range. Therefore, there is a need in some environments for a linear actuator which can shift a control component within a rather small operating range but which does not require the input drive sleeve to counteract a high torque load.

SUMMARY OF THE INVENTION

It is an object of the present invention to provide a linear actuator which can be used in those environments requiring an accurate, yet minimal, linear shifting range and which counteracts high torques developed such that the force needed to be counteracted by an input drive sleeve is minimized.

These and other objects of the present invention are accomplished by providing a differential linear actuator having a fixed actuator housing within which is rotatably mounted a drive sleeve. An intermediate actuator member is concentrically mounted between the actuator housing and the drive sleeve and is spline connected to the drive sleeve such that rotation of the drive sleeve results in rotation of the intermediate actuator member. The intermediate actuator member is connected to the actuator housing through a rotary to linear connection assembly such that rotation of the intermediate actuator member causes axial shifting of the intermediate actuator member relative to the housing. An output member is further connected to a remote end of the intermediate actuator member through another rotary to linear connection assembly such that rotation of the intermediate actuator member also causes linear displacement of the output member. The linear to rotary connection assemblies between the intermediate actuator member and the actuator housing and between the intermediate actuator member and the output member are arranged such that the output member is axially shifted in a direction opposite to the intermediate actuator member. Furthermore, the rotary to linear connection assemblies are designed such that the output member is axially displaced relative to the actuator housing a distance greater than the intermediate actuator member.

By this arrangement, the torque exerted on the intermediate actuator member at the rotary to linear connection between the intermediate actuator member and the output member is opposite to the torque exerted on the intermediate actuator member at the rotary to linear connection between the intermediate actuator member and the actuator housing. Therefore, the resultant torque exerted on the intermediate actuator member and transmitted to the drive sleeve is greatly reduced. In addition, due to the differential linear movement between the intermediate actuator member and the output member, an accurate linear displacement of the output member can be achieved while utilizing a relatively high RPM motor. Also according to the invention, a linear variable displacement transducer can be incorporated between the actuator housing and the output member of the differential linear actuator to accurately sense the position of the output member. This sensed position can be used to provide feedback information to a control module that, in turn, controls the power to the motor which rotates the drive sleeve.

Other objects, features and advantages of the present invention shall become more readily apparent from the following detailed description of a preferred embodiment thereof, when taken in conjunction with the draw-

BRIEF DESCRIPTION OF THE DRAWINGS

FIG. 1 is a cross-sectional side view of the differential linear actuator according to a preferred embodiment of the present invention in an extended state; and FIG. 2 shows a similar cross-sectional view of the differential linear actuator of the present invention to that shown in FIG. 1 with the actuator in a substantially retracted position.

DETAILED DESCRIPTION OF THE PREFERRED EMBODIMENT

Referring to both FIGS. 1 and 2, the differential linear actuator of the present invention is generally indicated at 1 and includes an actuator housing 5 having a first end portion 8 and a second end portion 11. First end portion 8 of actuator housing 5 is formed with mounting lugs 14 for fixedly securing actuator housing 5 to a support structure (not shown). Actuator housing 5, in the preferred embodiment, is generally cylindrical in shape having a hollow interior with second end portion 11 being open in an axial direction. Fixedly mounted within actuator housing 5 is a housing insert 17. In the preferred embodiment, actuator housing 5 is formed from metal such as steel or aluminum and housing insert 17, which is formed from a similar metal, is welded or otherwise fixedly secured within actuator housing 5. Housing insert 17 includes a central bore 20 aligned with the longitudinal axis of actuator housing 5 and is formed with an axially extending annular flange 23.

Differential linear actuator 1 further includes an elongated annular drive sleeve 27 having a first end portion 32 which terminates in a bearing ring 36. Press fit or otherwise fixedly secured to bearing ring 36 is an outer race 38 of an annular ball bearing assembly (not labeled). The inner race 41 of the annular ball bearing assembly is press fit or otherwise fixedly secured to annular flange 23 of housing insert 17 such that a plurality of bearing balls 44 are located between inner and outer races 38, 41 such that drive sleeve 27 is rotatable relative to actuator housing 5.

Fixedly secured to or integrally formed with drive sleeve 27 is a driven bevel gear 48 which meshes with a drive bevel gear 51 secured to a drive shaft 53 of an electric motor 56. Electric motor 56 is fixedly secured to actuator housing 5 which, in turn, is formed with a transversely extending bore 59 through which drive shaft 53 extends. By this arrangement, when electric motor 56 is actuated, drive sleeve 27 is rotated about its longitudinal axis relative to actuator housing 5 through drive and driven bevel gears 51 and 48 respectively. The type of motor is not restricted to electric motors since hydraulic or air motors can be utilized as well.

The outer surface of drive sleeve 27 is formed with a plurality of longitudinal splines 65. An intermediate actuating member 70 is concentrically mounted between drive sleeve 27 and actuator housing 5. Intermediate actuating member 70 has a first end 74 terminating in an inwardly projecting annular flange portion 76, formed with an axially extending through hole 79 which is internally splined, and a second end 83 terminating in an inwardly projecting annular flange portion 86, also formed with an axially extending through hole 89. Intermediate actuating member 70 is generally hollow such that drive sleeve 27 extends through axially extending through hole 79 such that longitudinal splines 65, formed on the outer surface of drive sleeve 27, are interengaged with the internal splines formed in axially extending through hole 79. In this manner, intermediate actuating member 70 can axially slide relative to drive sleeve 27 and is rotatably driven by drive sleeve 27 in response to actuation of electric motor 56.

Differential linear actuator 1 of the present invention further includes an actuator output shaft 92 having a first end 95 and a second, terminal end 98. Terminal end 98 includes a rod end 101 generally fitted with a spherical bearing (not shown) for fixedly securing actuator output shaft 92 to a control component (not shown) which is adapted to be linearly shifted. Actuator output shaft 92 is externally, helically grooved as indicated at 106 and extends through axially extending through hole 89 formed in second end 83 of intermediate actuating member 70. Actually, inwardly extending annular flange portion 86 of intermediate actuating member 70 includes an internal helical groove 113 which is connected to external helical groove 106 formed on actuator output shaft 92 by a plurality of balls 116. Therefore, inwardly extending annular flange portion 86 of intermediate actuating member 70 actually comprises a ball nut of a rotary to linear conversion connection and includes a ball return passage 119 (FIG. 2) which functions to permit recirculation of the plurality of balls 116. In general, such recirculating ballscrew rotary to linear connection assemblies are known in the art and function such that rotation of intermediate actuator member 70 results in linear shifting of actuator output shaft 92 through the plurality of balls 116.

Second end portion 11 of actuator housing 5 constitutes a second ball nut of a second rotary to linear connection assembly that acts between actuator housing 5 and intermediate actuating member 70 and includes an internal helical groove 125 which is connected to an external helical groove 128 formed in the outer surface of intermediate actuating member 70 between first end 74 and second end 83 by a plurality of balls 131. In general, this rotary to linear conversion connection is identical to the connection between actuator output shaft 92 and intermediate actuating member 70 except that the external helical groove 128 formed on intermediate actuating member 70 is opposite to the external helical groove 106 formed on actuator output shaft 92 and has a different pitch angle for the reason which will be more fully discussed below.

In use, when lug 14 of actuator housing 5 is fixedly secured to a support structure and rod end 101 of actuator output shaft 92 is fixedly secured to a linearly adjustable control component, actuation of motor 56 will cause rotation of drive sleeve 27 through drive bevel gear 51 and driven bevel gear 48. Due to the spline connection between drive sleeve 27 and intermediate actuating member 70, rotation of drive sleeve 27 will result in rotation of intermediate actuating member 70. Due to the interconnection between intermediate actuating member 70 and actuator housing 5, the rotation of intermediate actuating member 70 will result in axial shifting thereof in a direction governed by the rotational direction of intermediate actuating member 70. At the same time, rotation of intermediate actuating member 70 will cause actuator output shaft 92 to shift axially relative to actuator housing 5 in a direction opposite to the axial shifting direction of intermediate actuating member 70. This differential linear movement is clearly shown by comparing FIGS. 1 and 2. In FIG.

1, intermediate actuating member 70 has axially shifted relative to actuator housing 5 such that first end 74 is located closely adjacent to drive bevel gear 51 and actuator output shaft 92 is substantially fully extended. Upon rotation of motor 56 in a predetermined direction, differential linear actuator 1 will be adjusted from the position shown in FIG. 1 to that shown in FIG. 2 wherein first end 74 of intermediate actuator member 70 has been axially shifted away from drive bevel gear 51 and actuator output shaft 92 has been retracted within intermediate actuating member 70. By selecting appropriate pitch or lead angles of the helical grooves (106,113; 125,128) connecting actuator output shaft 92 to intermediate actuating member 70 and intermediate actuating member 70 to actuator housing 5, the linear stroke of differential linear actuator 1 can be traded for gear ratio in that the torque acting on the second end 83 of intermediate actuating member 70 offsets the torque reacted on intermediate actuating member 70 through its connection with actuator housing 5 such that the splines 65 of drive sleeve 27 need only provide a small portion of the balancing torque required by the unit. Depending upon the length of the actuator versus required stroke, it is possible to achieve high gear ratios utilizing the differential linear actuator of the present invention. For example, if the resultant gear ratio is 100:1, then the spline 65 of drive sleeve 27 would be required to provide about 1/100 of the holding or driving force. Therefore, the chances of drive sleeve 27 being damaged and resulting in inoperability of differential linear actuator 1 is greatly reduced. In this fashion high gear ratios are provided for in a linear package unlike bulky gearboxes required by conventional means.

An additional aspect of the present invention is to provide a linear variable displacement transducer generally indicated at 135 to sense the position of actuator output shaft 92 relative to actuator housing 5 and to provide feedback information to a control module (not shown) that, in turn, outputs command signals to motor 56. Linear variable displacement transducer 135 is of generally known construction and includes an elongated cylindrical portion 139 having a reduced diameter end portion 146 which extends through central bore 20 formed in housing insert 17. Reduced diameter end portion 46 is externally threaded at 149 such that elongated cylindrical portion 139 of the linear variable displacement transducer 135 can be fixedly secured to actuator housing 5 by means of a nut 152. Linear variable displacement transducer 135 further includes a piston 157 which is connected to actuator output shaft 92 by means of an actuator rod 161 so as to be slidably received within cylindrical portion 139 of linear variable displacement transducer 135.

As previously stated, linear variable displacement transducer 135 is generally of known construction and includes an electrical coil located between two wall layers of cylindrical portion 139 which creates a magnetic field within cylindrical portion 139. As piston 157, which is formed from metal, slides within cylindrical portion 139, the magnetic field created is obstructed at the position of piston 157 which corresponds to the position of actuator output shaft 92 relative to actuator housing 5. This position signal is intended to be fed to a control module through wires (not shown) connected to the coil between the layers of the cylindrical portion 139 and extending either out through reduced diameter portion 146 or through a separate aperture (not shown) formed in housing insert 17. It should be recognized that it is possible to utilize a linear variable displacement transducer 135 in the differential linear actuator 1 of the present invention since the linear variable displacement transducer 135 is interconnected between two non-rotating elements. This is important since, if actuator output shaft 92 was to rotate, the magnetic field within cylindrical portion 139 would be disrupted and inaccurate readings would result.

Although described with respect to a particular embodiment of the invention, it is to be understood that various changes and/or modifications can be made without departing from the spirit of the invention. For instance, if differential linear actuator 1 of the present invention is used in an environment which results in substantial vibrations to the system, it is possible to coat the end portion of drive sleeve 27, such as at 165, with a low friction material, e.g. nylon, to act as a low friction bearing surface between cylindrical portion 139 of linear variable displacement transducer 135 and drive sleeve 27. In addition, it should be understood that although an electric motor 56 was described for use in the preferred embodiment, various other types of motors such as pneumatic and hydraulic units could also be utilized within the spirit of the present invention. In general, the present invention is only intended to be limited by the scope of the following claims.

I claim:

1. A differential linear actuator comprising:
   an actuator housing having a first end, adapted to fixedly mount said actuator housing to a support structure, and an open second end,
   an elongated drive sleeve mounted within said housing for rotation about a longitudinal axis, said drive sleeve including an axially splined outer surface;
   means for rotatably driving said drive sleeve;
   an intermediate actuator member concentrically mounted between said actuator housing and said drive sleeve, said intermediate actuator member including a first end portion, an intermediate portion and a second end portion, said first end portion including an internally splined section intermeshingly engaged with the splined outer surface of said drive sleeve such that rotation of said drive sleeve by said drive means causes rotation of said intermediate actuator member and said second end portion extending axially out of the open second end of said actuator housing;
   first axial shifting means interconnected between the intermediate portion of said intermediate actuator member and said actuator housing for causing said intermediate actuator member to be axially shifted relative to said housing upon rotation of said intermediate actuator member;
   an elongated output member adapted to be secured, at one end thereof, to a linearly movable element, said output member being concentrically mounted with respect to said intermediate actuator member; and
   second axial shifting means interconnected between said second end portion of said intermediate actuator member and said output member for causing said output member to be axially shifted, in a direction opposite to the axial shifting direction of said intermediate actuator member, upon rotation of said intermediate actuator member.

2. A differential linear actuator as claimed in claim 1, wherein said first and second axial shifting means comprises recirculating ball screw actuators.

3. A differential linear actuator as claimed in claim 1, wherein said output member comprises a helical screw shaft and the second end portion of said intermediate actuator member comprises a helical screw nut, said helical screw shaft and nut being interconnected by a plurality of balls.

4. A differential linear actuator as claimed in claim 3, wherein said elongated output member is externally, helically threaded.

5. A differential linear actuator as claimed in claim 4, wherein the second end portion of said intermediate actuator member is formed with a ball recirculating passage.

6. A differential linear actuator as claimed in claim 1, wherein the intermediate portion of said intermediate actuator member is externally, helically threaded and said actuator housing is internally helically threaded adjacent the second end thereof, the intermediate, threaded portion of said intermediate actuator member being connected to the internally threaded actuator housing through a plurality of balls.

7. A differential linear actuator as claimed in claim 4, wherein the intermediate portion of said intermediate actuator member is externally, helically threaded and said actuator housing is internally helically threaded adjacent the second end thereof, the intermediate, threaded portion of said intermediate actuator member being connected to the internally threaded actuator housing through a plurality of balls.

8. A differential linear actuator as claimed in claim 7, wherein the external, helical threads on the intermediate portion of said intermediate actuator member are opposite in direction to the external, helical threads of said output member.

9. A differential linear actuator as claimed in claim 1, further comprising a linear position sensing variable displacement transducer including a first component fixedly secured to the first end of said actuator housing and a second component attached to said output member.

10. A differential linear actuator as claimed in claim 9, wherein said second component is fixedly secured to said output member and is adapted to reciprocate within said first component.

11. A differential linear actuator as claimed in claim 9, wherein said first component is concentrically mounted within said drive sleeve.

12. A differential linear actuator as claimed in claim 1, wherein said drive means comprises an electric motor.

13. A differential linear actuator as claimed in claim 12, wherein said electric motor includes a drive shaft having a bevel gear fixedly secured thereto which meshes with a bevel gear carried by said drive sleeve.

14. A method of linearly shifting an output member of a differential linear actuator having a fixed actuator housing, an elongated drive sleeve rotatably mounted within the actuator housing, an intermediate actuator member drivingly connected to the drive sleeve for rotation therewith but which is shifted axially relative to the drive sleeve and actuator housing upon rotation and an output member connected to said intermediate actuator member for linear movement relative thereto in response to rotation of said intermediate actuator member, said method comprising rotating said drive sleeve so as to cause said intermediate actuator member to rotate and to shift axially relative to said drive sleeve and said actuator housing in a first direction and to cause said output member to shift axially relative to said intermediate actuator member, said drive sleeve and said actuator housing in a direction opposite to said first direction with said output member being axially displaced relative to said housing a distance greater than said intermediate actuator member.

15. A method of linearly shifting an output member of a differential linear actuator as claimed in claim 14, further comprising measuring the axial shifting of said output member relative to said housing and controlling the rotation of said drive sleeve thereupon.

* * * * *